M. ARNDT.
APPARATUS FOR TESTING AIR OR OTHER GASES.
APPLICATION FILED JAN. 4, 1910.
1,063,946.
Patented June 10, 1913.
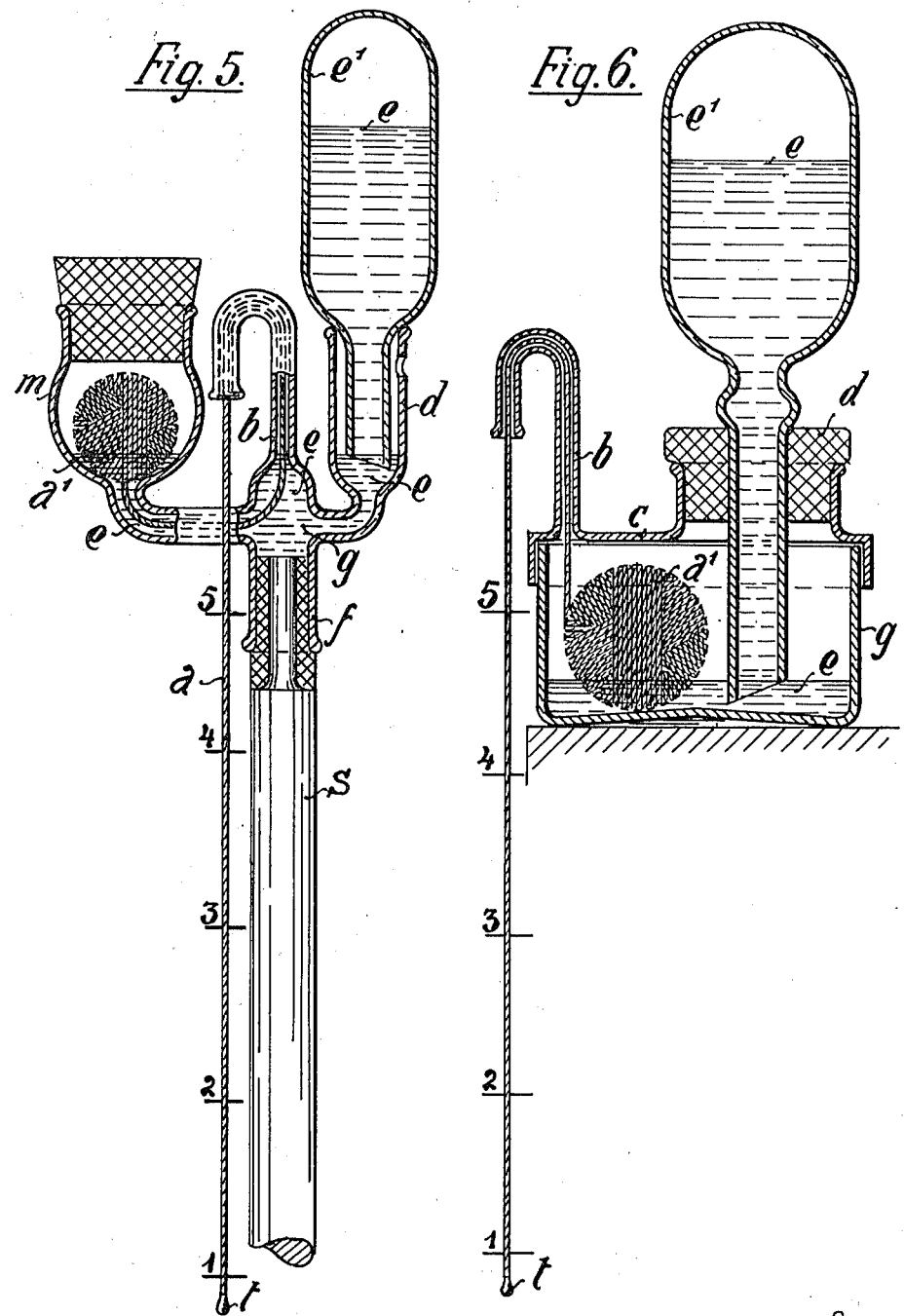

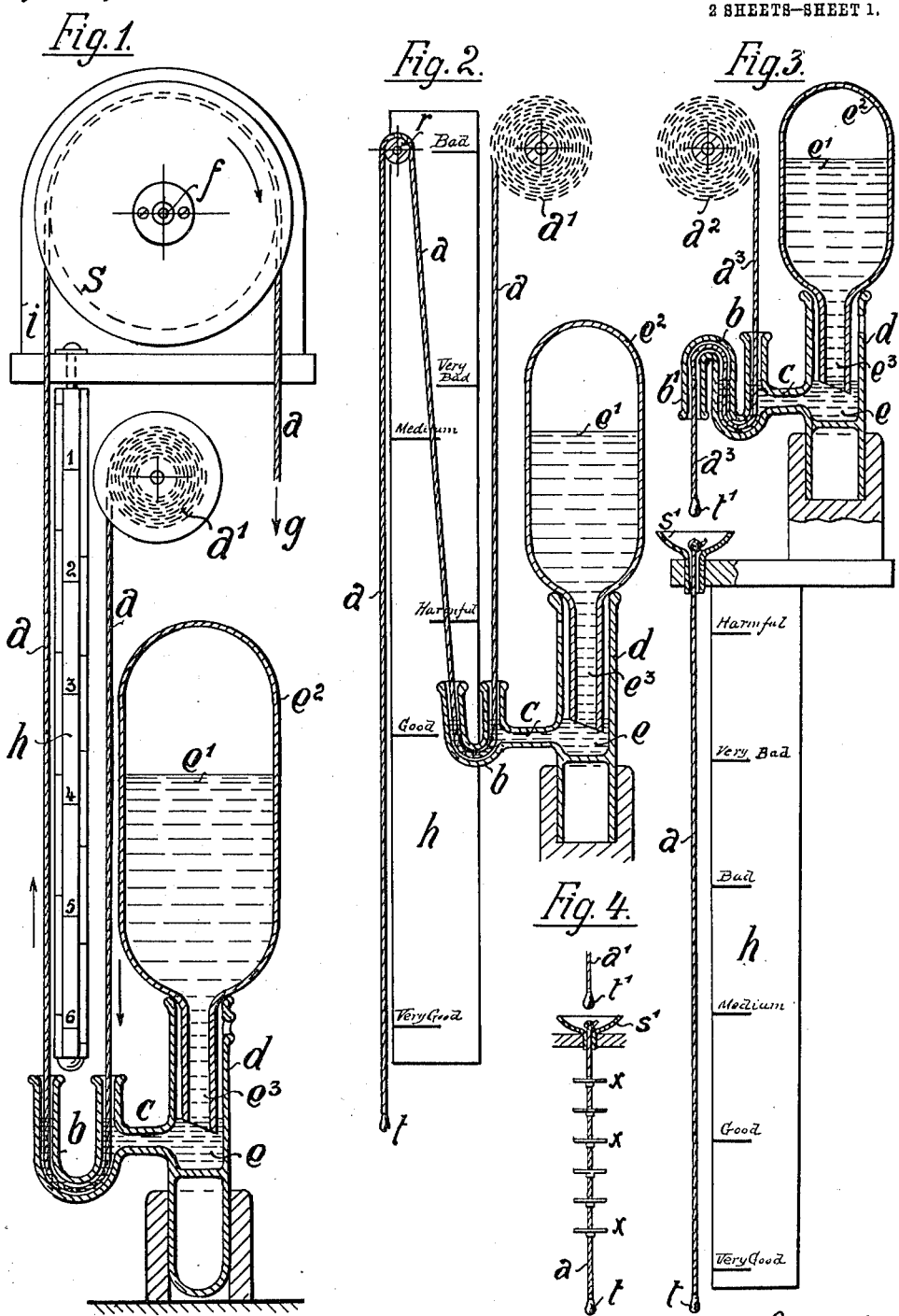

UNITED STATES PATENT OFFICE.

MAX ARNDT, OF AIX-LA-CHAPELLE, GERMANY.

APPARATUS FOR TESTING AIR OR OTHER GASES.

1,063,946.  Specification of Letters Patent.  Patented June 10, 1913.

Application filed January 4, 1910. Serial No. 536,387.

*To all whom it may concern:*

Be it known that I, MAX ARNDT, a subject of the German Emperor, residing at the city of Aix-la-Chapelle, in the Kingdom of Prussia, German Empire, have invented certain new and useful Improvements in Apparatus for Testing Air or other Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to apparatus for testing air or other gases, in which the admixture of certain kinds of gases is determined by the decolorization of a reagent.

The liquid reagent can readily lose its efficacy when preserved for a long time, and therefore devices are necessary for preparing the thread for testing the gas or air at the very moment when the test is to begin. To this end, I provide an apparatus in which the thread passes through a receptacle, in which the liquid reagent flowing into said receptacle from a small reservoir is supplied to the thread.

Some illustrative embodiments of my invention are represented by way of example in the accompanying drawing, wherein:—

Figure 1 is an elevation, partly in section, showing one form of apparatus, Figs. 2 and 3 are vertical sections showing modified forms, Fig. 4 is a detail view, and Figs. 5 and 6 are vertical sections showing other modified forms of my apparatus.

Referring firstly to Fig. 1, a roller or spool $s$ carried by axle $f$ and rotated continuously or intermittently by clockwork mounted in casing $i$ carries around it the testing thread $a$ which passes through a U-shaped reagent receptacle $b$. This receptacle is carried by and is in open relation through duct $c$ with a reservoir $d$ for the liquid reagent $e$ into which the storage vessel $e^2$ for the store $e^1$ of reagent opens. The thread $a$ comes from a roller or spool $a^1$, passes thence to the bent tube $b$ and then along a scale $h$ to roller $s$.

$e^3$ is the outlet of vessel $e^2$ through which air enters when the liquid in reservoir $d$ is used up and passes from vessel $e^2$ to reservoir $d$.

Instead of thread $a$ a band or other body of absorbent material may be used if preferred.

This apparatus operates as follows:—If the testing thread consists, for example, of white yarn prepared with phenolphthalein and the liquid reagent $e$ of lime water, when entering into receptacle $b$ thread $a$ absorbs a portion of the small quantity of lime water contained in this receptacle and obtains an intensive violet color with which it leaves receptacle $b$, to which fresh lime water flows slowly through duct $c$. This duct or tube $c$ may be a capillary tube so that when the thread contacts with the liquid reagent the colored liquid is prevented from returning to the store $e^1$ of lime water in vessel $e^2$. As the thread $a$, which is now exposed to the air to be tested, moves uniformly and loses its violet color more rapidly the more the air, for example, surrounding it contains carbon dioxid, from the place onward at which the thread appears white again the nature of the air in each instance can be read on scale $h$. In like manner and, if necessary, by means of other reagents, other kinds of gases can be tested for the admixture of a special gas.

In the illustrative embodiment shown in Fig. 2, in which corresponding parts are designated with like characters as in Fig. 1, the testing thread $a$ passes through the U-tube $b$ and, after going over a roller $r$, down scale $h$. This apparatus comprises an inverted open flask $e^2$ containing the store $e^1$ of a colored liquid reagent, a reservoir $d$ carrying said flask, containing a small quantity of the liquid reagent $e$, and connected by duct or tube $c$ with the test-tube or reagent receptacle $b$, a thread of yarn $a$, scale $h$ and a supply of yarn $a^1$. The part of the thread $a$ in receptacle $b$ absorbs some of the liquid reagent. When the thread has absorbed such a quantity of the reagent in reservoir $d$ that the neck $e^3$ of flask $e^2$ is exposed below, a bubble of air enters into the neck of the flask, in which manner, as is known, the level of the liquid in reservoir $d$ and in receptacle $b$ is maintained approximately constant. The lower the end of thread $a$ is located below the level of the reagent, the greater will the absorbability of the thread be and the more frequently will the reagent leave the end of the thread in drops $t$. After a certain time a fresh portion of thread is unwound from the supply $a^1$ and the previously used portion is cut off, in order thus to obtain a new testing thread $a$.

In the illustrated embodiment according to Fig. 3 the apparatus has the same arrangement for maintaining as constant a quantity of the liquid reagent as possible in the reservoir $d$ and tubes $c$ and $b$, but a definite length of the testing thread $a$ hangs in a funnel-like dish $s^1$ to which the liquid reagent is supplied in drops $t^1$ by means of a special thread $a^3$. A fresh piece of yarn $a$ of definite length is suspended in the dish $s^1$ and absorbs the liquid dropping from the thread $a^3$ and finally delivers it in drops $t$. Tube or receptacle $b$ is preferably here made S-shaped.

Fig. 4 shows the arrangement at or on thread $a$ of optional indicators $x$, such as pieces of filter paper which absorb the liquid reagent from the thread.

In the modification illustrated in Fig. 5 the supply of the testing thread $a^1$ is accommodated in a closed chamber $m$ communicating with the inverted U tube or receptacle $b$; the thread passes through the liquid reagent and is then suspended in front of a scale on a rod S that forms the support for the testing apparatus and to which it is secured by a socket $f$.

In the modification illustrated in Fig. 6 the supply $a^1$ of the testing thread is preserved together with the liquid reagent $e$ in the same closed chamber $g$.

I claim:—

1. In apparatus for testing air and other gases in which the admixture of a gas is determined by the decolorization of a liquid reagent, the combination with movable means for absorbing a reagent, of reagent delivering means to guide said absorbing means during its passage therethrough and to change its direction of movement, and means to supply liquid reagent to the delivering means maintained under a substantially constant hydraulic head.

2. In apparatus for testing air and other gases, in which the admixture of a gas is determined by the decolorization of a body prepared with a liquid reagent, the combination with a receptacle, of a reservoir for the liquid reagent in open relation therewith, a thread passing through said receptacle, and a scale arranged in operative relation with respect to said thread.

3. In apparatus for testing air and other gases, in which the admixture of a gas is determined by the decolorization of a body prepared with a liquid reagent, the combination with a receptacle, of a reservoir for the liquid reagent in open relation therewith, an inverted vessel containing a supply of the reagent and opening into said reservoir, a thread passing through said receptacle, and a mechanically driven roller carrying said thread.

4. In apparatus for testing air and other gases, in which the admixture of a gas is determined by the decolorization of a body prepared with a liquid reagent, the combination with a receptacle, of a reservoir for the liquid reagent in open relation therewith, an inverted vessel containing a supply of the reagent and opening into said reservoir, a mechanically driven roller, a second roller, and a thread passing over the former roller, through said receptacle, upwardly to said second roller and downwardly.

5. In apparatus for testing gases, the combination with a filamentous absorbing body; of a U-shaped guide therefor, means to supply liquid reagent to said guide under substantially a constant hydraulic pressure, said guide and means in open relation to one another.

6. In apparatus for testing gases, the combination with an absorbing yarn; of a U-shaped guide therefor, a reagent supply means and a capillary connection between said guide and means.

7. In apparatus for testing gas, the combination with means to maintain a constant reagent liquid level, of a thread, a thread guide connected to said means, and mechanism to move the thread through the guide to absorb said reagent.

8. In apparatus for testing gas, the combination with means to maintain a constant liquid reagent level; of a thread, a thread guide connected to said means and adapted to change the direction of travel of the thread, and means to move the thread through the guide.

9. In apparatus for testing gas, the combination with means to maintain a constant liquid reagent level; of a thread, a thread guide in which the thread changes its direction of travel during its passage therethrough, a capillary connection between said guide and means, and means for moving the thread through the guide.

In testimony that I claim the foregoing as my invention, I have signed my name in presence of two subscribing witnesses.

MAX ARNDT.

Witnesses:
HENRY ANADFLIEG,
ELISE KOLBUSCH.